United States Patent [19]

Jöst

[11] Patent Number: 4,522,600
[45] Date of Patent: Jun. 11, 1985

[54] WIND PROPULSION FOR ALL TYPES OF VEHICLES AND STATIONARY MACHINES

[76] Inventor: Bernhard Jöst, Traminerweg 4, D-6800 Mannheim 31, Fed. Rep. of Germany

[21] Appl. No.: 634,656

[22] Filed: Jul. 26, 1984

Related U.S. Application Data

[63] Continuation of Ser. No. 395,050, filed as PCT DE 81/00175 Oct. 10, 1981, published as WO 82/01398, Apr. 29, 1982, § 102(e) date Jun. 15, 1982, abandoned.

[30] Foreign Application Priority Data

Oct. 18, 1980 [DE] Fed. Rep. of Germany ....... 3039387

[51] Int. Cl.³ .............................................. B63H 13/00
[52] U.S. Cl. ......................................................... 440/8
[58] Field of Search .................. 440/8, 71, 28, 72, 26, 440/30, 31; 114/90, 102; 46/58; 416/151

[56] References Cited

U.S. PATENT DOCUMENTS

| | | | |
|---|---|---|---|
| 775,971 | 11/1904 | Helmeke | 440/8 |
| 1,181,988 | 5/1916 | Breitung | 440/8 |
| 1,226,699 | 5/1917 | Saunders | 440/71 |
| 1,471,870 | 10/1923 | Tust | 440/8 |
| 2,510,336 | 6/1950 | Donahue | 46/58 |
| 3,377,976 | 4/1968 | Gustine | 440/28 |
| 4,016,823 | 4/1977 | Davis | 114/90 |

FOREIGN PATENT DOCUMENTS

| | | | |
|---|---|---|---|
| 1581072 | 10/1967 | Fed. Rep. of Germany | 440/8 |
| 13264 | of 1895 | United Kingdom | 440/71 |
| 18747 | of 1897 | United Kingdom | 440/8 |

Primary Examiner—Trygve M. Blix
Assistant Examiner—Edwin L. Swinehart
Attorney, Agent, or Firm—Collard, Roe & Galgano

[57] ABSTRACT

There is provided a wind propulsion device for driving a transmission shaft connected through intermediate members with devices for force transmission. The wind propulsion device comprises a wind impeller having a plurality of wind wings which are concavely curved against the air stream. The wind wings are axially connected to a semisphere convexly curved against the air stream which is axially disposed with respect to said impeller. The semisphere guides the air stream impinging on the center of the impeller to the tips of the wings for efficient wind utilization.

11 Claims, 13 Drawing Figures

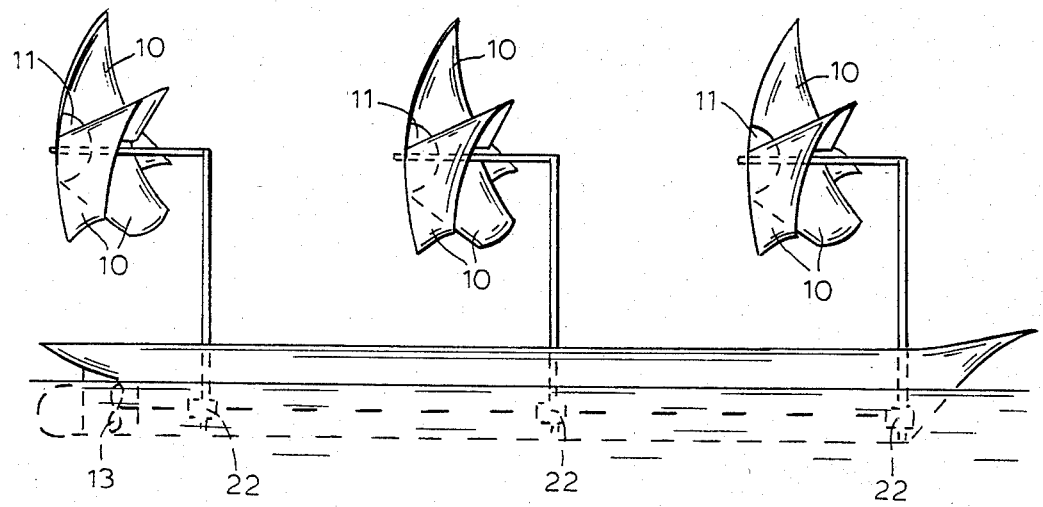
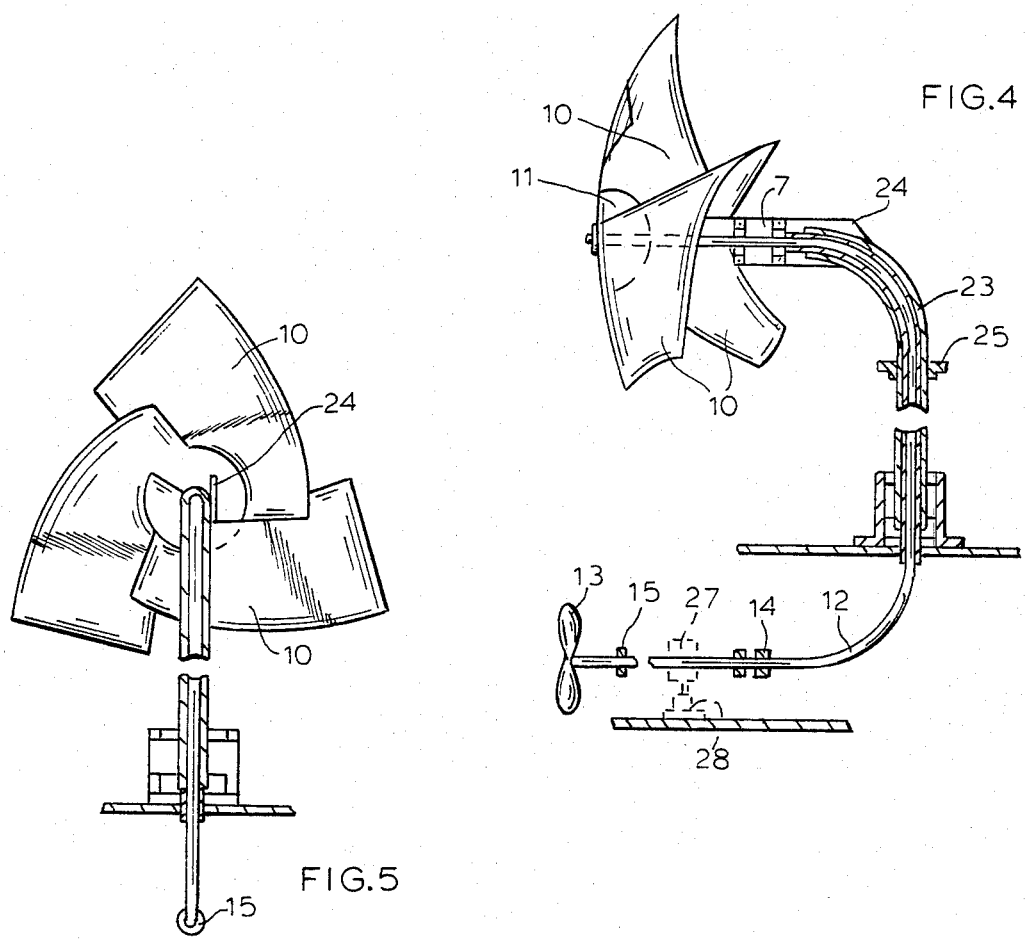

WIND PROPULSION FOR ALL TYPES OF VEHICLES AND STATIONARY MACHINES 395,050, filed as PCT DE 81/00175 Oct. 10, 1981, published as WO 82/01398, Apr. 29, 1982, § 102(e) date June 15, 1982, entitled "WIND PROPULSION FOR ALL TYPES OF VEHICLES AND STATIONARY MACHINES", now abandoned.

The subject invention is suitable for land vehicles in wind rich areas and waterborne vehicles of any type and size from a toy to the largest passenger or freight ship, also for driving stationary machines and power generators.

The vehicles should reach a suitable speed at a direct head wind.

Wind powered structures are available in all varieties from the old wind mill to the American wind wheel and up to the modern single blade impeller. In addition, vertical shaft devices in different embodiments.

In the commonly known wind propulsion machines, air resistance prevents a driving against the wind and the required power emission is generated only at large wind velocities (propeller). Therefore, they are suitable for stationary power stations, but hardly for driving of vehicles. Our own tests have shown this.

It is an object of the invention to eliminate these inefficiencies. The air throughflow must be reduced and the admitted blade face must be enlarged at the smallest possible diameter.

These problems were solved with the subject invention. Already at a wind velocity of 2, the tested models (a boat and a lagoon sailboat), travel directly against the head wind. The same model boat is driven back when driven with the hitherto known wind motors, while this novel wind propulsion drives the boat forward with increasing speed parallel with the increasing wind velocity. Tests have shown that this novel wind propulsion provides a multiple of the efficiency hitherto possible with the known wind propulsion, while having the same blade diameter. Advantageously, flexible shafts are provided for small boats.

The blades are behind the mast, so that they are automatically directed in the direction of the wind. Control elements, like an auxilliary propeller or controls which brake the circular movement of the ambient air, are eliminated.

For stabilizing smaller boats, instead of the conventional lee board, a pendulum (or a plurality) may be mounted below at the keel which automatically bends rearward when bottom obstacles are met during the forward movement and is directed to the bow side during reverse travel. This can be pulled up to the keel by means of a manual or electro winch, whereby it additionally protects the keel from damages. The difference with respect to other ballast weights or devices which can only be adjusted in a vertical direction is that such vertical devices easily bend when coming into engagement with bottom obstacles and therefore become unuseable.

The blades can be made pivotable by means of hinges or other joints and can be controlled mechanically or electrically with corresponding devices.

A power generator which can be coupled to the screw shaft can charge a rather large battery during anchoring and also when travelling with excess wind power, so that power is supplied without cost for light, cooking, heating or short trips, or during a calm.

The subject models, as well as the sailboats of known types, do not require any raw materials and do not pollute, but have the following advantages:
1. Travel directly against the wind (no zig-zag travel).
2. No control of sails, since the blades adjust automatically.
3. No danger of capsizing, since an unfavorable position is not possible.
4. One person control like in a motor boat.
5. With direct headwind, increasing speed of boat during increasing wind velocity.
6. Own cost free power supply.

The wind propulsion can be equipped with one, two, three or more blades.

BRIEF DESCRIPTION OF THE DRAWINGS

In the drawings:

FIG. 3 is a side elevational view of a larger boat with three coupled wind drives according to the present invention;

FIG. 4 is a side elevational view partly in cross section of a modified implementation example of the forced transmission according to FIG. 2;

FIG. 5 is a front elevational view of the embodiment example shown in FIG. 4, as seen from the right;

DESCRIPTION OF THE PREFERRED EMBODIMENTS

Figure 1:
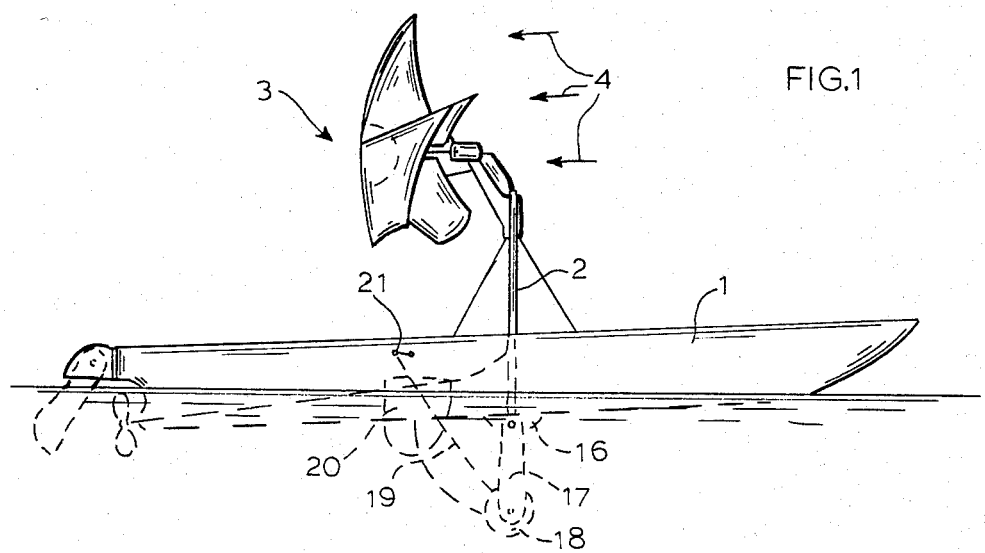
FIG. 1 is a side elevational view of a small boat with the wind drive according to the present invention.
Figure 2:
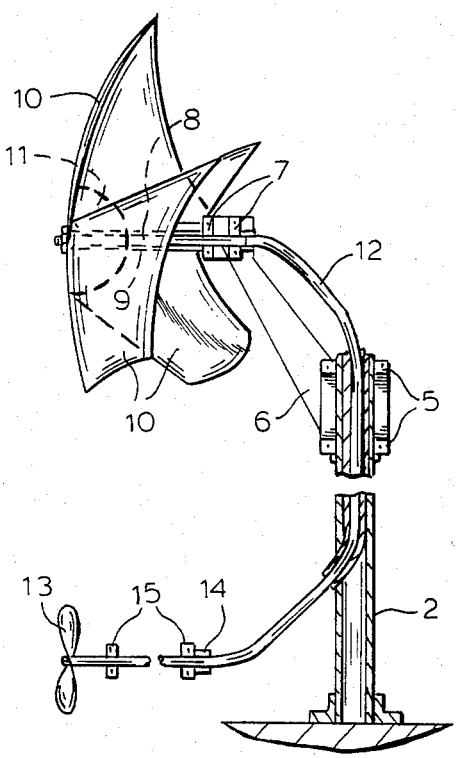
FIG. 2 is a side elevational view partly in cross section of the detail of a simple device for transmitting wind energy to a water propeller.

As seen in FIGS. 1 and 2, on a mast 2 secured to a boat element 1 there is disposed a wind impeller 3 consisting of three wind wings 10, and wherein the direction of the wind is indicated by arrows 4. Mast 2 is tubular in form and is provided with a bearing 5 and a carrier arm 6 secured thereto. Carrier arm 6 carries on its upper end a bearing 7 for the axle 8 of wind impeller 3. On axle 8 there is mounted a tube 9, which is connected with wings 10 through a semisphere 11 formed of sheet metal or synthetic material.

The torque generated by the wind force is transferred by wings 10 to a flexible shaft 12 through slip-on tube 9. Flexible shaft 12 is guided through tubular mast 2 and through coupling 14 and carries on its read end a water propeller 13 whose shaft is coupled to shaft 12 and is supported in bearing 15. Regulation of the velocity of the boat can therefore be accomplished through the coupling 14.

To stabilize the boat, instead of the otherwise conventional lee at the lower keel, a holder 6 is provided for a pivotable arm 17 which is rotatably supported on the lower end of a swivel roll 18. The pivoting arm 17 can be pulled by means of a rope drive 19 into the lee box 20 by means of a manual or electrical hoist 21 up to its half length.

As can be seen in FIG. 3, a larger water craft having disposed thereon three wind impellers connected through bevel gears 22 and a common shaft drive water propeller 13.

Figure 6:
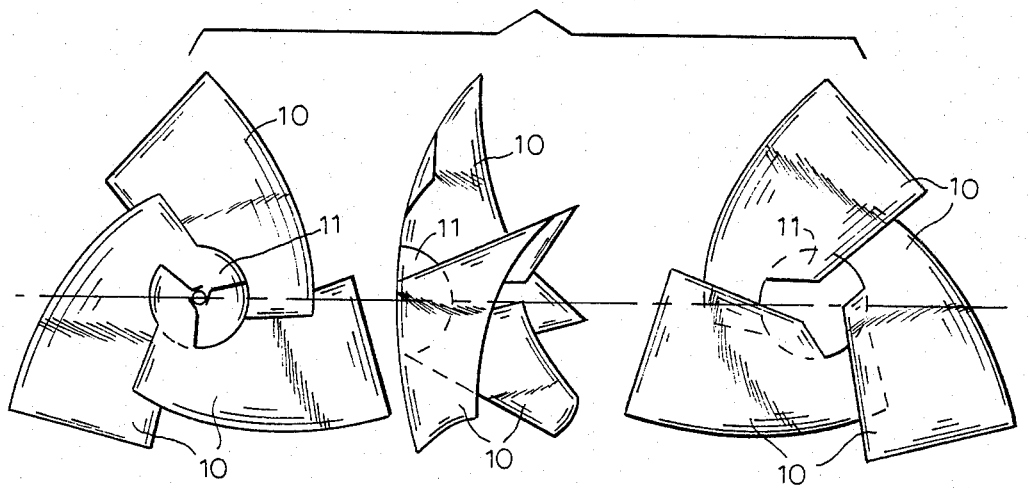
FIG. 6 is a view of a detailed representation of a three-winged wind wheel as seen from the front, from the side and from the rear.

In FIGS. 4 and 5, there is shown an implementation of the wind drive according to the present invention, with a rotatably supported and bent mast tube 23, on which there is disposed a holder 24 for the bearing 7 of the axle of wings 10. On the rotatably supported holder ring 25, there are provided eyelets for the securement shroud. The lower end of flexible shaft 12 is supported in a similar manner as in FIG. 2, but there is disposed a coupling 27 (in phantom) on the axle of the water propeller 13, which can be connected in case of necessity, with a generator 28 (in phantom) for generation of electricity. In FIG. 6 there are shown three respective views of a three-wing wind wheel or impeller. Wings 10 are concavely curved in the direction of the wind stream (see arrows 4 in FIG. 1) and are also connected with the semisphere 11 convexly curved in the direction of the wind stream. The convexly curved semisphere 11 guides the air stream impinging at the center of the wings 10 to the tip of the wings.

Figure 7:
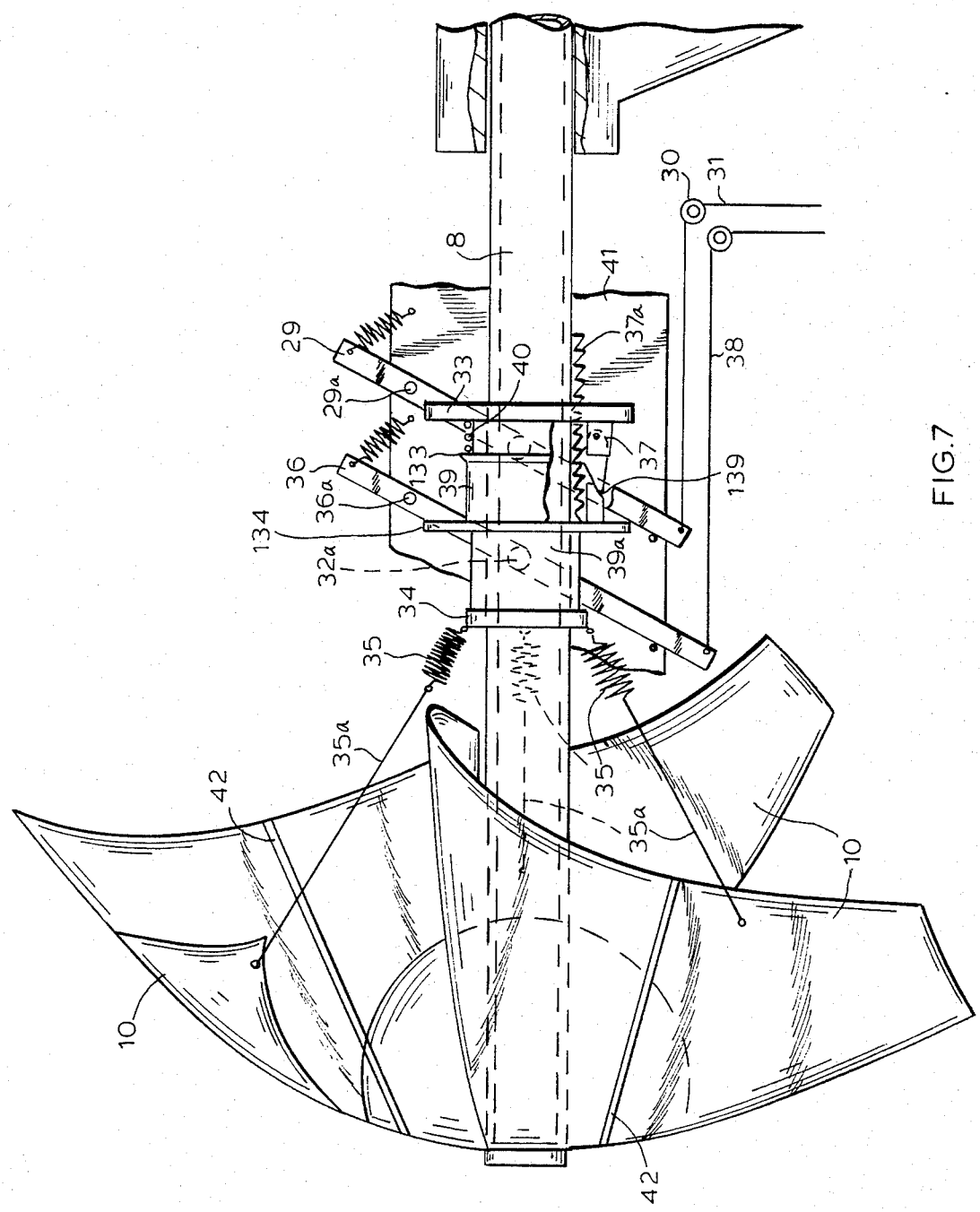
FIG. 7 is a view showing the mechanism for pivoting of the wings of the wind wheel rearwardly and forwardly.

FIG. 7 shows a mechanical arrangement for pivoting the wings 10 rearwardly and forwardly which is secured to a rigid support, designated 41. This arrangement includes a sleeve 39a slidably mounted on axle 8 which is driven by wings 10, sleeve 39a being provided with disks 33 and 34 at each end of the sleeve. Also slidably mounted on sleeve 39a is sleeve 39 which is biased from disk 33 by means of spring 40 which engages sleeve 39 at end 133 thereof. The other end of sleeve 39 is provided with a disk 134. Disk 34 of sleeve 39a has connected thereto springs 35 which are connected in turn to ropes 35a which are attached to the tips of wings 10 and control the movement thereof about hinge 42 or similar joint. A ratchet pawl 37 is connected to disk 33 of sleeve 39a and engages with ratchet teeth 37a attached to axle 8 to thereby prevent the forward movement of sleeve 39a when the ratchet is engaged. Sleeve 39 is provided with a ratchet release cam 139 for releasing pawl 37 from the engagement with ratchet teeth 37a when sleeve 39 moves to the right. A lever 29, pivoted at 29a to support 41, is provided with a roller 32 for engagement with disk 33 for moving sleeve 39a to the right to thereby move wings 10 to the right. Lever 29 is operated by means of tackle 30, 31. A second lever 36 which is pivoted at 36a to support 41 is provided with a roller 32a which engages with disk 134 of sleeve 39. Roller 32a is operated by lever 36 to move sleeve 39 to the right against the biasing action of spring 40 to thereby disengage ratchet pawl 37 from ratchet teeth 37a and thereby permit wings 10 to move leftwardly under the force of the wind.

In operation, lever 29 is operated by tackle 30, 31 so as to engage roller 32 with disk 33 to thereby move wings 10 about hinges 42 to the right so as to take full advantage of the wind force experienced by the wings. Once the wings 10 have been positioned as desired, a relaxation of the tension on tackle 30, 31 results in ratchet pawl 37 falling into engagement with ratchet teeth 37a thereby setting the position of the wings. When it is desired to reset the wings 10 leftwardly, lever 36 is operated by applying tension to tackle 38 so that roller 32a engages with disk 134 which, after overcoming the bias of spring 40, disengages ratchet pawl 37 from ratchet teeth 37a by means of ratchet release cam 139 so that the ratchet is disengaged and sleeve 39a is free to move leftwardly along axle 8, thus allowing wings 10 to also move leftwardly to a reset position.

Figure 9:
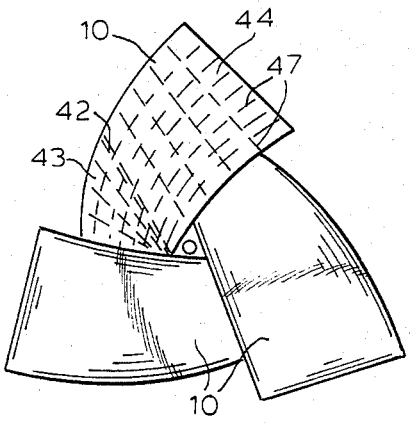
FIG. 9 is a view of the wind drive with divided wings.
Figure 8:
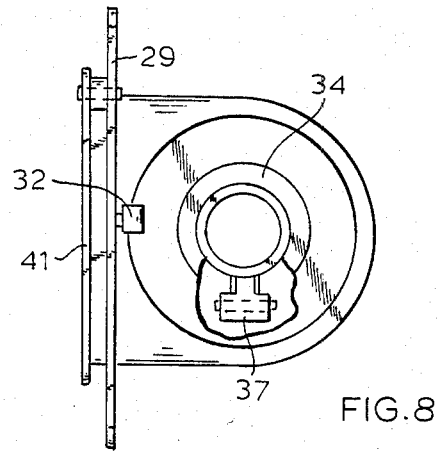
FIG. 8 is a view of part of the mechanism shown in FIG. 7 as seen from the left.

In FIG. 9 there is illustrated a wind impeller wherein the wings 10 are each partitioned by a hinge 42 or similar joint. The inner portion 43 is connected to axle 8 or to semisphere 11 while the outer portion 44 is connected to the axle or semisphere by means of a torsion spring 45 (FIG. 10) or a tension spring 46 (FIG. 12) and elastically yields during a strong wind. If the wings are to be set still during an arbitrarily strong wind, then advantageously the device according to FIG. 7 can be used. Since wings 10 are not only inclined because of the transverse arrangement of the joint but also pivot, they are impacted on the rear side during a strong inclination forwardly or rearwardly and thus come to rest. A still further inclination is accomplished by a change of the direction of rotation. Thus, it is possible to rest such vehicles without any drive or coupling or to let them proceed forwardly or rearwardly. Elastic longitudinal rods or tubes 47 formed from light metal or synthetic material can be inserted into the wings which are covered with fabric or synthetic material, and which are easily removed by hinged rings or snap hooks. The fabric or synthetic material can also be made liftable or collapsible by means of rope sheets. If the longitudinal rods or tubes 47 are installed under tension outwardly, then the cross connections 48 shown in FIG. 9 can be dispensed with. When using highly elastic rods or tubes, hinges, springs or other regulating devices can be dispensed with, as the wings automatically yield rearwardly when there is too strong a storm, and consequently no torque arises. All wings, from light sheet metal, synthetic materials or rods with fabric, can also be subdivided, axially or radially, through hinges or torsion springs or rigid connections for transporting or mounting.

Figure 10:
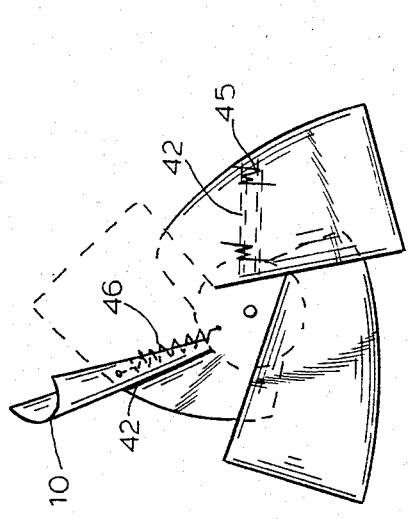
FIG. 10 is a view of the wind drive showing a wing folded rearwardly.
Figure 13:
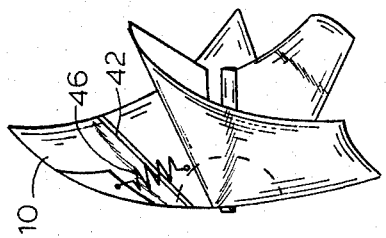
FIG. 13 shows a holder for the wing drive in detail.
Figure 11:
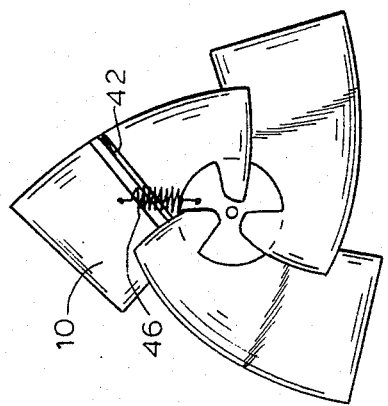
FIGS. 11 and 12 show a side view and a front view, respectively, of the wings with a hinge and a tension spring.
Figure 12:
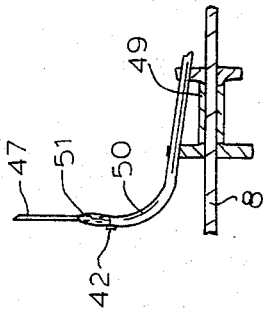

In FIG. 10, a wing folded rearwardly with a tension spring 46 has been illustrated, as well as wings 10 with a torsion spring 45. FIG. 11 shows the wing in side view with a hinge 42 and a tension spring 46. FIG. 12 shows a view from the right of the wing device shown in FIG. 11. In FIG. 13 there is shown a detail of a holder for the base of the wing or for the tubes 47. On a wing axle 8, there is disposed a sleeve 49 with disks for receiving the bent tubes 50. At the end there is provided a hinge 42, which is connected to the wing with a clamping device 51, into which the wing rods 47 are inserted.

The inventive wind drive can, of course, also be used for land vehicles as well as stationary drive machines or current generators instead of the water vehicles illustrated in the examples.

I claim:
1. A wind propulsion device for driving a transmission shaft connected through intermediate members with devices for force transmission, comprising:
   (a) a wind impeller including a plurality of wind wings which are concavely curved against the air stream;
   (b) a semisphere convexly curved against the air stream and axially disposed with respect to said impeller to which said wind wings are connected, said semisphere guides the air stream at the center of the impeller to the tips of the wings for efficient wind utilization and is formed of sheet metal; and (c) an axle having mounted thereon for rotation a tube to which said semisphere and wings are connected, said tube driving said transmission shaft.

2. The wind propulsion device according to claim 1, wherein said wind wings are divided by a hinge joint, the inner portions being rigidly connected to said semisphere, and the outer portions being pivotably yieldable by means of springs.

3. The wind propulsion device as defined in claim 1, wherein said semisphere is formed of synthetic material.

4. The wind propulsion device as defined in claim 2, wherein said wind wings are pivotably yieldable by means of a mechanism which includes:

a bushing slideably mounted on said axle and biased to a rest position by means of a compression spring, said bushing being moveable on said axle by means of levers and tackle, and the position of the wings being accomplished by means of tension springs controlled by said bushing.

5. The wind propulsion device as defined in claim 1, wherein said wings are formed of light gauge sheet metal.

6. The wind propulsion device as defined in claim 1, wherein said wings are formed of synthetic material.

7. The wind propulsion device as defined in claim 1, wherein said wings include light metal rods with a fabric covering.

8. The wind propulsion device as defined in claim 7, wherein the covering is of synthetic material.

9. The wind propulsion device as defined in claim 7, wherein a holder for the wing rods is provided on said axle, the holder consists of a sleeve with curved tubes having moveable portions secured thereto, and said wing rods are inserted into the moveable portions of the curved tubes.

10. The wind propulsion device as defined in claim 2, wherein the outer portions of the wings are maintained in the operating position by springs and yieldably resist in a self-actuating manner during any strong wind.

11. The wind propulsion device as defined in claim 4, wherein the mechanism for actuation of the wings is slid onto said axle and is secured to a holder device.

* * * * *